(12) United States Patent
Fu et al.

(10) Patent No.: US 10,730,528 B2
(45) Date of Patent: Aug. 4, 2020

(54) METHOD AND DEVICE FOR DETERMINING A SAFETY-CRITICAL YAWING MOTION OF A VEHICLE

(71) Applicant: Robert Bosch GmbH, Stuttgart (DE)

(72) Inventors: Chengxuan Fu, Kirchheim (DE); Solomon Devakiruba Selvakumar, Tamil Nadu (IN)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 16/087,890

(22) PCT Filed: Mar. 16, 2017

(86) PCT No.: PCT/EP2017/056287
§ 371 (c)(1),
(2) Date: Sep. 24, 2018

(87) PCT Pub. No.: WO2017/178187
PCT Pub. Date: Oct. 19, 2017

(65) Prior Publication Data
US 2019/0111936 A1   Apr. 18, 2019

(30) Foreign Application Priority Data
Apr. 12, 2016  (DE) .................. 10 2016 206 077

(51) Int. Cl.
 *B60W 40/114*  (2012.01)
 *B60T 8/1755*  (2006.01)
 (Continued)

(52) U.S. Cl.
 CPC ......... *B60W 40/114* (2013.01); *B60T 8/1755* (2013.01); *B60W 40/072* (2013.01);
 (Continued)

(58) Field of Classification Search
 CPC ............ B60W 40/072; B60W 40/114; B60W 2040/1346; B60W 2520/14;
 (Continued)

(56) References Cited

U.S. PATENT DOCUMENTS 5,369,580 A * 11/1994 Monji ................. B60T 8/17551
701/1
5,671,982 A * 9/1997 Wanke ................ B60T 8/17551
303/146
(Continued)

FOREIGN PATENT DOCUMENTS

DE        10048418 A1   4/2002
DE   112012007213 T5   8/2015
(Continued)

OTHER PUBLICATIONS

International Search Report dated Jun. 14, 2017 of the corresponding International Application PCT/EP2017/056287 filed Mar. 16, 2017.

*Primary Examiner* — Atul Trivedi
(74) *Attorney, Agent, or Firm* — Norton Rose Fulbright US LLP; Gerard Messina (57) ABSTRACT

A method for determining a safety-critical yawing motion of a vehicle includes comparing a specification signal representing an ascertained setpoint yaw rate of the vehicle for an anticipated trajectory of the vehicle to a measuring signal representing an instantaneous yaw rate of the vehicle measured based on an actual trajectory of the vehicle, thereby generating a comparison signal; checking whether an amplitude of the comparison signal exceeds a first threshold value and whether a frequency of the comparison signal exceeds a second threshold value; and, in response to the amplitude exceeding the first threshold and the frequency exceeding the second threshold, outputting a yawing-motion signal
(Continued)

indicating presence of the safety-critical yawing motion of the vehicle.

7 Claims, 5 Drawing Sheets

(51) Int. Cl.
*B60W 40/072* (2012.01)
*G06K 9/00* (2006.01)
*B60W 40/13* (2012.01)

(52) U.S. Cl.
CPC ...... *G06K 9/00798* (2013.01); *B60T 2250/03* (2013.01); *B60T 2260/024* (2013.01); *B60W 2040/1346* (2013.01); *B60W 2520/14* (2013.01); *B60W 2720/14* (2013.01)

(58) Field of Classification Search
CPC ........... B60W 2720/14; G06K 9/00798; B60T 8/1755; B60T 2260/024; B60T 2250/03
USPC .......................................................... 701/1
See application file for complete search history.

(56) References Cited

U.S. PATENT DOCUMENTS

| | | | | |
|---|---|---|---|---|
| 5,710,705 A * | 1/1998 | Eckert | ................. | B60T 8/17551 180/197 |
| 5,711,024 A * | 1/1998 | Wanke | ................. | B60T 8/1755 180/197 |
| 5,732,379 A * | 3/1998 | Eckert | ................. | B60T 8/1755 303/140 |
| 6,366,833 B1 * | 4/2002 | Fukuyama | .............. | B60T 8/172 701/1 |
| 2003/0042790 A1 * | 3/2003 | Amberkar | ............... | B60T 8/172 303/140 |
| 2004/0015284 A1 * | 1/2004 | Suissa | ....................... | B62D 6/00 701/82 |
| 2004/0060765 A1 * | 4/2004 | Mattson | ................ | B60W 30/02 180/422 |
| 2006/0204347 A1 | 9/2006 | Waldbauer et al. | | |
| 2008/0086248 A1 * | 4/2008 | Lu | ........................... | B60T 8/171 701/41 |
| 2009/0105906 A1 * | 4/2009 | Hackney | ............... | B60W 30/02 701/38 |
| 2009/0299633 A1 * | 12/2009 | Hawes | ................ | B60R 21/0134 701/300 |
| 2011/0166744 A1 * | 7/2011 | Lu | ........................ | B60T 8/1755 701/29.2 |
| 2011/0178671 A1 * | 7/2011 | Bae | ........................ | G01B 21/26 701/31.4 |
| 2011/0202238 A1 * | 8/2011 | Cebon | .................... | B62D 13/04 701/41 |
| 2013/0231825 A1 * | 9/2013 | Chundrlik, Jr. | ........... | G01P 3/50 701/29.1 |
| 2014/0049646 A1 * | 2/2014 | Nix | ....................... | B60W 50/14 348/148 |
| 2015/0329108 A1 * | 11/2015 | Kodaira | ................ | B60W 10/20 701/41 |
| 2018/0111621 A1 * | 4/2018 | Buss | ..................... | B62D 13/06 |
| 2019/0009815 A1 * | 1/2019 | Lavoie | ............... | B62D 15/0285 |

FOREIGN PATENT DOCUMENTS

WO 2011/042966 A1 4/2011
WO 2011/070645 A1 6/2011

* cited by examiner

METHOD AND DEVICE FOR DETERMINING A SAFETY-CRITICAL YAWING MOTION OF A VEHICLE

CROSS-REFERENCE TO RELATED APPLICATIONS

The present application is the national stage of International Pat. App. No. PCT/EP2017/056287 filed Mar. 16, 2017, and claims priority under 35 U.S.C. § 119 to DE 10 2016 206 077.5, filed in the Federal Republic of Germany on Apr. 12, 2016, the content of each of which are incorporated herein by reference in their entireties.

FIELD OF THE INVENTION

The present invention relates to a method and device for responding to occurrence of a safety-critical vehicle yawing motion.

BACKGROUND

Yawing motions or rolling or transverse vibrations or lateral run-out can affect stability of a vehicle. Such motions can have different causes such as environmental conditions, a vehicle state, a driver behavior, driving with a trailer, etc. The document WO 2011/042966 A1 describes a device for detecting a roll state of vehicle trains and a behavior-control device.

SUMMARY

Example embodiments of the present invention are directed to a method, a device employing the method, and/or a computer program by which the method is executed for detecting rolling, lateral run-out, or yawing motion of a vehicle based on roadway curvature.

According to example embodiments, a detection of rolling or lateral run-out or a yawing motion of a vehicle is able to be realized in particular on the basis of a roadway curvature. For example, a safety-critical yawing motion of a vehicle can be determined by analyzing a detected deviation from a course of the vehicle that was calculated in advance.

According to example embodiments, in particular a lateral run-out or yawing, which can be caused by a trailer, for instance, is advantageously able to be detected in a reliable manner even if the vehicle is actively steered by the driver or a highly automated driving function. Because of such a detection of yawing motions or rolling or a lateral run-out, a vehicle is able to be stabilized in a timely, simple and safe manner, for example.

According to an example embodiment of the present invention, a method for determining a safety-critical yawing motion of a vehicle includes: comparing a specification signal, which represents an ascertained setpoint yaw rate of the vehicle for an anticipated trajectory of the vehicle, to a measured signal, which represents an instantaneous yaw rate of the vehicle based on a measured actual trajectory of the vehicle, in order to generate a comparison signal; checking the comparison signal to determine whether an amplitude of the comparison signal exceeds a first threshold value in order to supply a check signal when the first threshold value is exceeded; in response to the check signal, examining the comparison signal to determine whether a frequency of the comparison signal exceeds a second threshold value in order to supply an examination signal when the second threshold value is exceeded; and, in response to the examination signal, supplying a yawing-motion signal, which represents the safety-critical yawing motion of the vehicle.

This method can be implemented in the form of software or hardware or in a mixed form of software and hardware, for instance in a control unit. A safety-critical yawing motion can affect the driving safety, the driving comfort, or the like. The specification signal and additionally or alternatively the measuring signal can also represent a transverse acceleration of the vehicle relative to a driving direction. The method, in particular the yawing-motion signal, is able to be used for lane-keeping functions or for other steering-control functions for stabilizing the vehicle.

According to an example embodiment, in the step of examining, extreme points of the signal characteristic of the comparison signal are able to be examined with the aid of a derivation of a signal characteristic of the comparison signal. Utilizing the extreme points, an amplitude of the comparison signal is ascertainable. In this context, a derivation can be understood as the result of a single differentiation or derivation or as the result of multiple differentiations or derivations of the signal characteristic. Such an embodiment offers the advantage that it allows for a simple and rapid detection of an exceedance of the first threshold value or a safety-critical course deviation of the vehicle.

In the step of examining, it is also possible to examine turning points of the signal characteristic of the comparison signal, using a derivation of a signal characteristic of the comparison signal. In the process, a number of turning points that occur within a time interval can be examined. A frequency of the comparison signal is ascertainable with the aid of the turning points. The second threshold value can be related to a number of occurring turning points within a time interval. Such an embodiment offers the advantage that an exceedance of the second threshold value or a safety-critical yawing motion of the vehicle is able to be detected in an uncomplicated and reliable manner.

More specifically, a difference between the specification signal and the measuring signal can be formed in the step of comparing. The comparison signal can represent a difference signal. Such an embodiment offers the advantage that a possibly safety-critical course deviation of the vehicle is able to be detected in a simple, rapid, and reliable manner on the basis of an oscillation or amplitude of the difference signal.

Furthermore, the present method can include a step of reading in trajectory data from an interface with at least one environment sensor of the vehicle. In this context, the trajectory data can represent the anticipated trajectory of the vehicle. The at least one environment sensor can include a vehicle camera, in particular a video camera, a radar device, or the like. Such an embodiment offers an advantage that the anticipated trajectory of the vehicle is accurately and reliably ascertainable on the basis of such data.

In addition, the present method can include a step of ascertaining a setpoint yaw rate of the vehicle with the aid of trajectory data from an interface with at least one environment sensor of the vehicle for the purpose of generating the specification signal representing the setpoint yaw rate. The trajectory data can represent the anticipated trajectory of the vehicle. Such an embodiment offers an advantage that the setpoint yaw rate of the vehicle is able to be accurately and reliably ascertained for use in the present method.

According to an example embodiment, the trajectory data can be image data and video data detected with the aid of at least one environment sensor of the vehicle, and additionally or alternatively, the data can be radar data that could represent a roadway course of a roadway of the vehicle, a roadway curvature of a roadway of the vehicle and additionally or alternatively, lane markings of a roadway of the vehicle. Using the roadway course, the roadway curvature or an angle of curvature of the roadway and additionally or alternatively positions of the lane markings, the setpoint yaw rate of the vehicle is ascertainable. Such an embodiment offers an advantage that a meaningful and reliable data basis can be provided for ascertaining the setpoint yaw rate of the vehicle.

The approach introduced here furthermore provides a device, which is developed to carry out, actuate, or implement the steps of a variant of a method introduced here in corresponding devices. This variant of an embodiment of the present invention in the form of a device is also able to be used for achieving the objective on which the present invention is based in a rapid and efficient manner.

For this purpose, the device can include at least one processing unit for processing signals or data; at least one memory unit for storing signals or data; at least one interface with a sensor or an actuator for reading in sensor signals from the sensor or for outputting data or control signals to the actuator; and/or at least one communications interface for reading in or outputting data, which are embedded in a communications protocol. The processing unit, for example, can be a signal processor, a microcontroller or the like, and the memory unit can be a flash memory, an EPROM, or a magnetic memory unit. The communications interface can be developed to read in or output data in a wireless manner and/or via cable, and a communications interface, which is able to read in or output cable-transmitted data, is able to read in these data, for instance electrically or optically, from a corresponding data-transmission line, or to output the data onto a corresponding data-transmission line.

In the present case, a device can be understood as an electrical device which processes sensor signals and outputs control and/or data signals as a function thereof. The device can include an interface that could be developed in hardware and/or software. In the case of a hardware development, the interfaces can be part of what is known as a system ASIC, which includes a wide variety of functions of the device. However, it is also possible that the interfaces are discrete, integrated switching circuits or are at least partially made up of discrete components. In the case of a software development, the interfaces can be software modules that, for example, exist on a microcontroller in addition to other software modules.

In an advantageous further development, the device determines a possibly safety-critical movement of the vehicle about a vertical axis of the vehicle. For instance, the device is able to access sensor signals for this purpose, such as image signals, video signals and, additionally or alternatively, radar signals. An actuation of an assistance function, safety functions or the like, for example, takes place via actuators, which are developed to influence a steering angle of the vehicle.

An example embodiment is directed to a computer program product or a computer program having program code, which can be stored on a machine-readable carrier or memory medium such as a semiconductor memory, a hard disk memory or an optical memory and is used for executing, implementing, and/or actuating the steps of the present method according to one of the afore-described example embodiments, in particular when the program product or program is executed on a computer or on a device.

Exemplary embodiments of the approach presented here are shown in the drawing and described in greater detail in the following description.

DETAILED DESCRIPTION

In the following description of advantageous exemplary embodiments of the present invention, identical or similar reference numerals are used for the elements that are shown in the various figures and have a similar effect, and a repeated description of these elements has been dispensed with.

Figure 1:
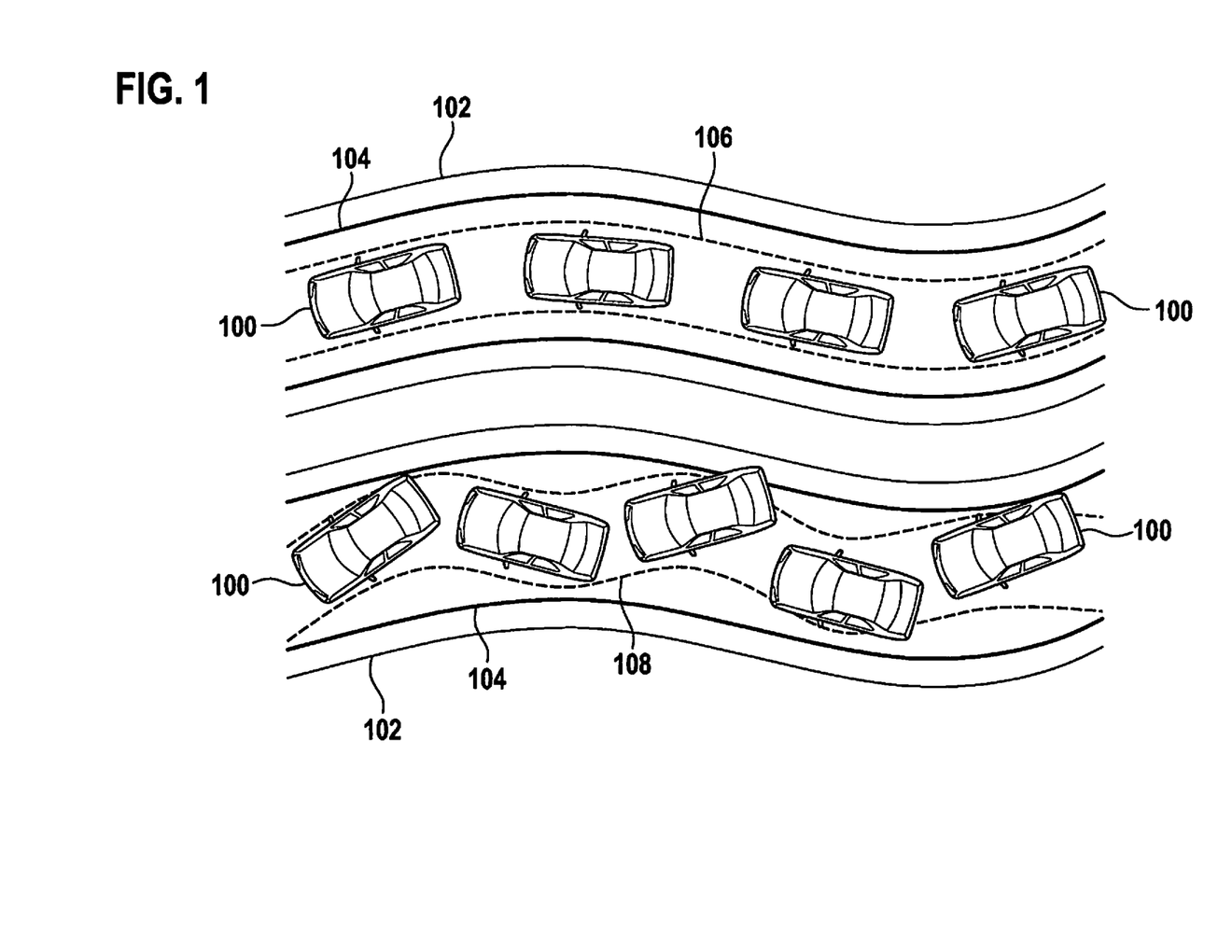
FIG. 1 is a schematized comparison representation of movements of a vehicle according to an example embodiment of the present invention.

FIG. 1 shows a schematized comparison illustration of movements of a vehicle 100 according to an exemplary embodiment. Vehicle 100 is shown multiple times in order to illustrate a movement. In FIG. 1, vehicle 100 is shown in two different movement states on a roadway 102, which is marked by lane markings 104. Roadway 102 and lane markings 104 have a curved characteristic in this instance.

The illustration in FIG. 1 is made up of two parts and includes an upper partial illustration and a lower partial illustration. In the upper partial illustration, a first trajectory 106 of vehicle 100 follows a course of roadway 102 or of lane markings 104. In other words, the upper partial illustration represents an illustration of a normally driving vehicle 100. In the lower partial illustration, vehicle 100 has a second trajectory 108, which features multiple curvatures relative to the course of roadway 102 or lane markings 104. To be more precise, the lower partial illustration represents an illustration of vehicle 100 under the influence of rolling or a lateral run-out or under the influence of a safety-critical yawing motion.

Put another way, first trajectory 106 of vehicle 100 represents an anticipated trajectory of vehicle 100, and second trajectory 108 represents an actual trajectory of vehicle 100. A difference between first trajectory 106 and second trajectory 108 results because of the safety-critical yawing motion that causes vehicle 100 to roll.

There are various causes of a safety-critical yawing motion, such as environmental conditions (reduced friction, grooves such as lane grooves, gravel, aquaplaning, and/or crosswind), a vehicle state (worn tires and suspension, different tire pressures, and/or incorrect tire balancing), a driver behavior (steering maneuvers and/or braking maneuvers in emergency situations and automatic steering-control systems), driving with a trailer (especially a heavy boat trailer featuring an unbalanced load), etc.

Figure 2:
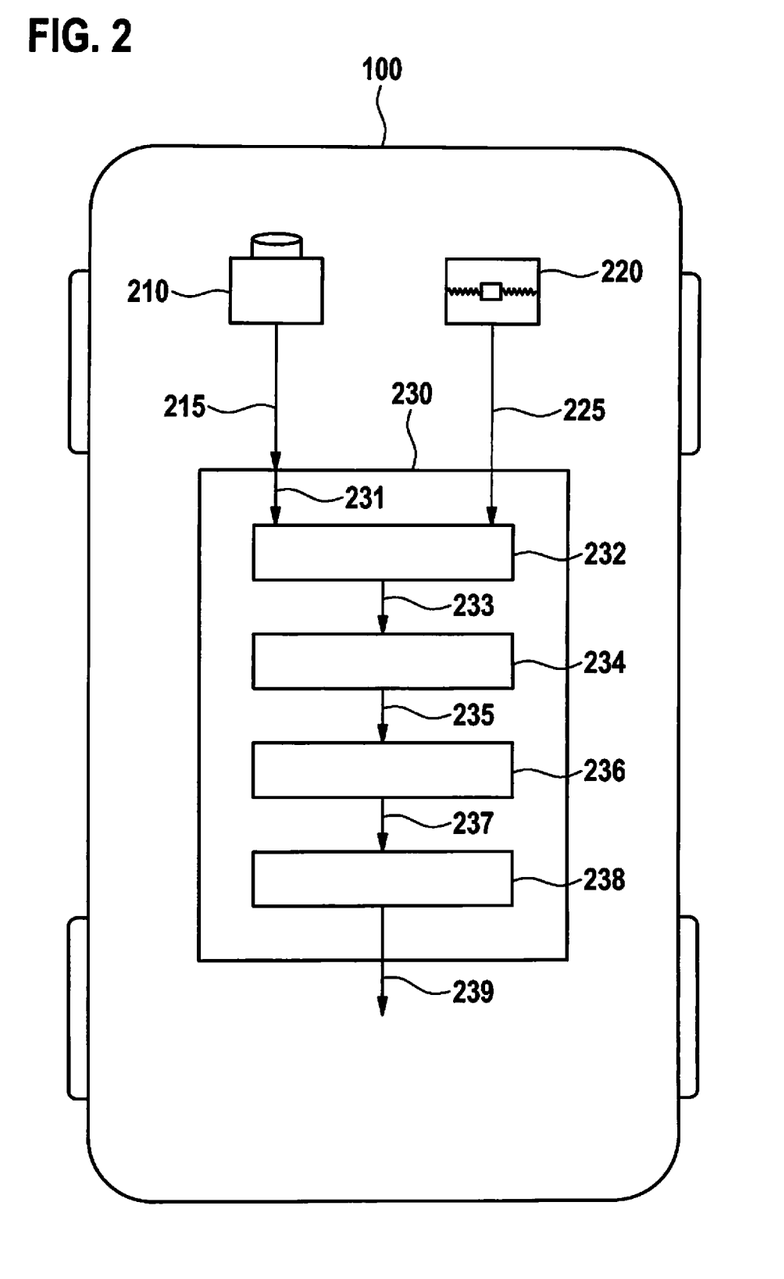
FIG. 2 is a schematized illustration of a device according to an example embodiment of the present invention.

FIG. 2 shows a schematized illustration of a device 230 according to an exemplary embodiment in a vehicle 100. Vehicle 100 is the vehicle from FIG. 1 or a similar vehicle. Merely by way of example, vehicle 100 is a passenger car, a truck or some other commercial vehicle.

For instance, vehicle 100 has only an environment sensor 210, a yaw-rate sensor 220, and a determination device 230 or device 230 for determining a safety-critical yawing motion of vehicle 100. Environment sensor 210 and yaw-rate sensor 220 are capable of transmitting signals, e.g., are connected to determination device 230 via at least one wired or wireless interface.

Environment sensor 210 according to the exemplary embodiment shown in FIG. 2 is developed as a vehicle camera, in particular a video camera. Environment sensor 210 is developed to detect an environment of vehicle 100. Environment sensor 210 is designed to supply trajectory data 215. Trajectory data 215 represent a roadway course of a roadway of vehicle 100, a roadway curvature of a roadway of vehicle 100, and/or lane markings of a roadway of vehicle 100. In other words, trajectory data 215 represent an anticipated trajectory of vehicle 100.

Yaw-rate sensor 220 is developed to detect a yaw rate of vehicle 100. Put another way, yaw-rate sensor 220 is developed to detect a movement or an acceleration of vehicle 100 about a vertical axis of vehicle 100. Optionally, yaw-rate sensor 220 can be developed to detect a transverse acceleration of vehicle 100. Yaw-rate sensor 220 is developed to supply a measuring signal 225. Measuring signal 225 represents an instantaneous yaw rate of vehicle 100 based on a measured actual trajectory of vehicle 100.

Determination device 230 is developed to read in trajectory data 215 from environment sensor 210 or from an interface with environment sensor 210. Determination device 230 is also developed to read in measuring signal 225 from yaw-rate sensor 220 or from an interface with yaw-rate sensor 220.

According to the exemplary embodiment shown in FIG. 2, determination device 230 is furthermore developed to determine a setpoint yaw rate of vehicle 100 for an anticipated trajectory of vehicle 100 with the aid of trajectory data 215 and to generate a specification signal 231 representing the setpoint yaw rate.

Determination device 230 has a comparison device 232, a checking device 234, an examination device 236, and a supply device 238. Comparison device 232 is developed to compare specification signal 231 with measuring signal 225 in order to generate a comparison signal 233. Checking device 234 is developed to check comparison signal 233 as to whether an amplitude of comparison signal 233 exceeds a first threshold value, in order to supply a check signal 235 if the first threshold value has been exceeded. As a result, checking device 234 is developed to supply check signal 235 in the event that the amplitude of comparison signal 233 exceeds the first threshold value. In response to check signal 235 or the presence of check signal 235, examination device 236 is developed to check comparison signal 233 to determine whether a frequency of comparison signal 233 exceeds a second threshold value in order to supply examination signal 237 when the second threshold value has been exceeded. As a result, examination device 236 is developed to supply examination signal 237 if the frequency of comparison signal 233 exceeds the second threshold value. Supply device 238 is developed to respond to examination signal 237 by supplying a yawing-motion signal 239, which represents the safety-critical yawing motion of the vehicle.

As a result, determination device 230 is developed to use trajectory data 215 and measuring signal 225 for generating yawing-motion signal 239. Yawing-motion signal 239 can be supplied to at least one control unit of vehicle 100, to an assistance system of vehicle 100 and the like in order to increase the stability of vehicle 100 or at least to reestablish the stability.

Figure 3:
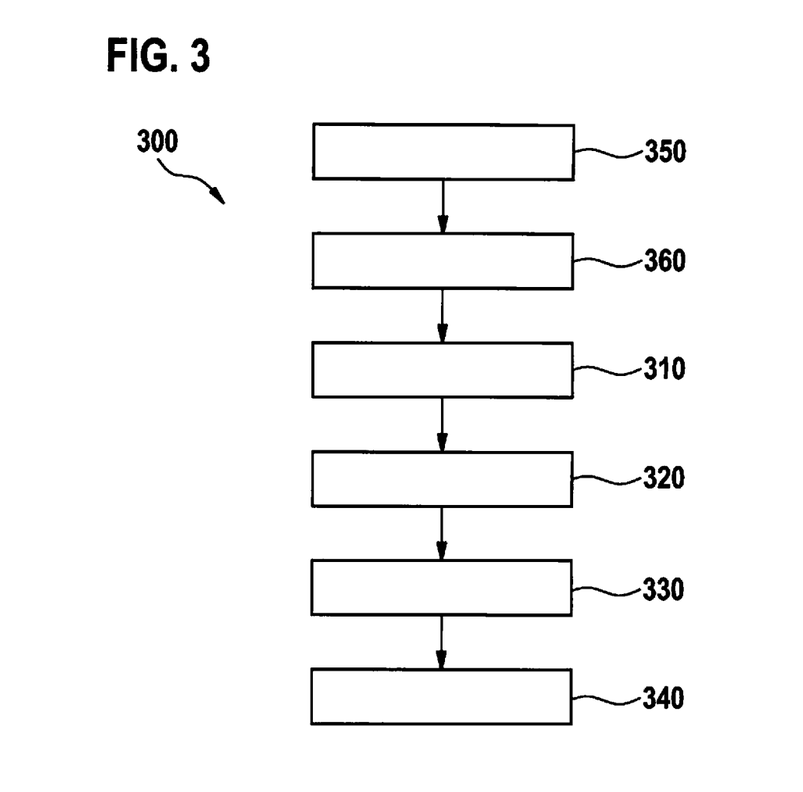
FIG. 3 is a flowchart of a method according to an example embodiment of the present invention FIG. 4 a flowchart of a subsegment of a determination process according to an example embodiment of the present invention FIG. 5 a flowchart of a subsegment of a determination process according to an example embodiment of the present invention.

FIG. 3 is a flowchart of a method 300 for determining according to an exemplary embodiment. Method 300 for determining can be carried out for the purpose of determining a safety-critical yawing motion of a vehicle. Method 300 for determining is able to be carried out in conjunction with the vehicle from FIG. 1 or FIG. 2 or a similar vehicle and/or in conjunction with the determination device from FIG. 2 or a similar device.

In a step 310 of comparing, a specification signal is compared to a measuring signal in method 300 in order to generate a comparison signal. The specification signal represents an ascertained setpoint yaw rate of the vehicle with regard to an anticipated trajectory of the vehicle. The measuring signal represents an instantaneous yaw rate of the vehicle based on a measured actual trajectory of the vehicle. In a step 320 of checking, the comparison signal is checked to determine whether an amplitude of the comparison signal exceeds a first threshold value, in order to supply a check signal when the first threshold value has been exceeded. In response to the check signal, in a step 330 of examining, the comparison signal is then examined to determine whether a frequency of the comparison signal exceeds a second threshold value, in order to supply an examination signal when the second threshold value has been exceeded. In response to the examination signal or to an exceeding of the first threshold value and an exceeding of the second threshold value, a yawing-motion signal is supplied in a step 340 of supplying, the signal representing the safety-critical yawing motion of the vehicle.

According to an exemplary embodiment, method 300 also has a step 350 of reading in and/or a step 360 of ascertaining. In step 350 of reading in, trajectory data are read in from an interface with a at least one environment sensor of the vehicle. The trajectory data represent the anticipated trajectory of the vehicle. In step 360 of ascertaining, a setpoint yaw rate of the vehicle is ascertained using trajectory data from an interface with at least one environment sensor of the vehicle, in an effort to generate the specification signal that represents the setpoint yaw rate.

Figure 4:
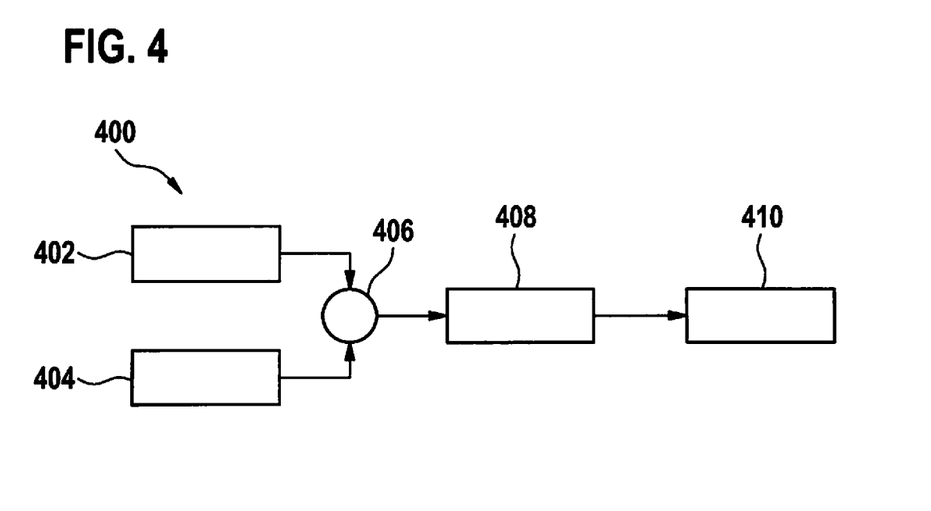

FIG. 4 is a flowchart 400 of a subsegment of a determination process according to an exemplary embodiment. The determination process can be carried out in conjunction with the method from FIG. 3 or a similar method or with the aid of the determination device and/or the vehicle from FIG. 2 or similar devices or vehicles. The subsegment of the determination process shown in FIG. 4 pertains to a first step of the determination process or to a determination of an amplitude of a yawing motion or of rolling or a lateral run-out.

In the subsegment of the determination process illustrated in FIG. 4, transverse accelerations of a vehicle are used, and a transverse acceleration is linked or correlated with a yaw rate of the vehicle. A block 402 represents a detection of a transverse acceleration or an actual transverse acceleration of a vehicle. A block 404 represents an ascertainment of an ideal or anticipated transverse acceleration of the vehicle. In a block 406, block 402 and block 404 are merged or combined. According to the exemplary embodiment shown in FIG. 4, a difference is formed between the transverse acceleration and an ideal transverse acceleration in block 406. From block 406, the determination process reaches a block 408 in which an amplitude of the yawing motion or the rolling or a lateral run-out amplitude is determined. The determination process subsequently reaches a block 410 in which a derivation of the amplitude of the lateral run-out is formed.

Figure 5:
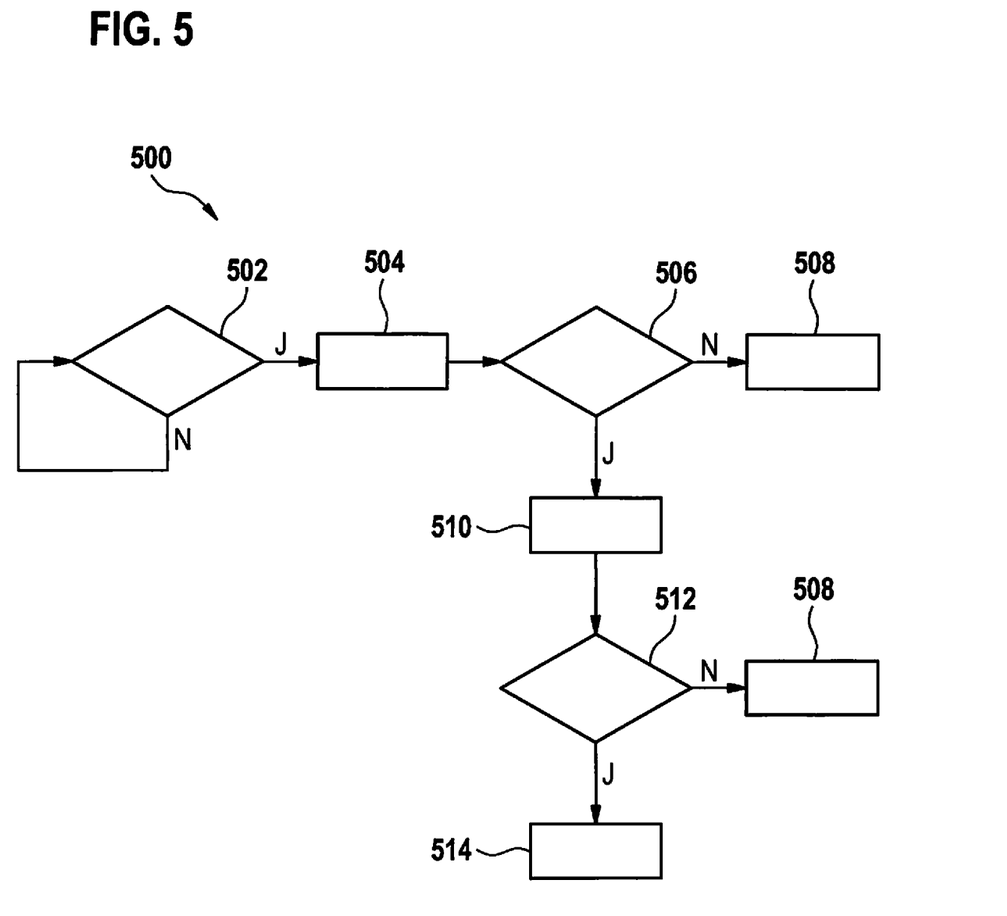

FIG. 5 is a flowchart 500 of a subsegment of a determination process according to an exemplary embodiment. The subsegment of the determination process illustrated in FIG. 5 is able to be carried out in conjunction with the subsegment of the determination process illustrated in FIG. 4 or as a continuation of the subsegment shown there. The determination process can be carried out in conjunction with the method from FIG. 3 or a similar method, or with the aid of the determination device and/or the vehicle from FIG. 2 or in a similar manner. The subsegment of the determination process shown in FIG. 5 relates to a second step of the determination process or to an analysis of a yawing motion or of rolling or a lateral run-out.

In a block 502, it is checked whether the amplitude of the lateral run-out is greater than a threshold or a threshold value. If this is not the case, then block 502 of the determination process is repeated in a loop. If the amplitude of the lateral run-out is higher than the threshold, the determination process transitions to a block 504 in which a first derivation check is carried out. The determination process then transitions to a block 506 in which it is determined whether a critical point or local maxima or minima occur(s). If this is not the case, the determination process transitions to a block 508 in which an analysis is continued. If it is determined in block 506 that a critical point or a local maxima or minima occurs, then the determination process transitions to a block 510 in which a turning-point counter is implemented or started. The determination process then continues with a block 512 in which it is examined whether two turning points occur within a time threshold. If this is not the case, the determination process transitions to block 508 in which the analysis is continued. If it is determined in block 512 that two turning points occur within a time threshold, then the determination process reaches a block 514 in which a lateral run-out or a yawing motion as such is identified.

Figure 6:
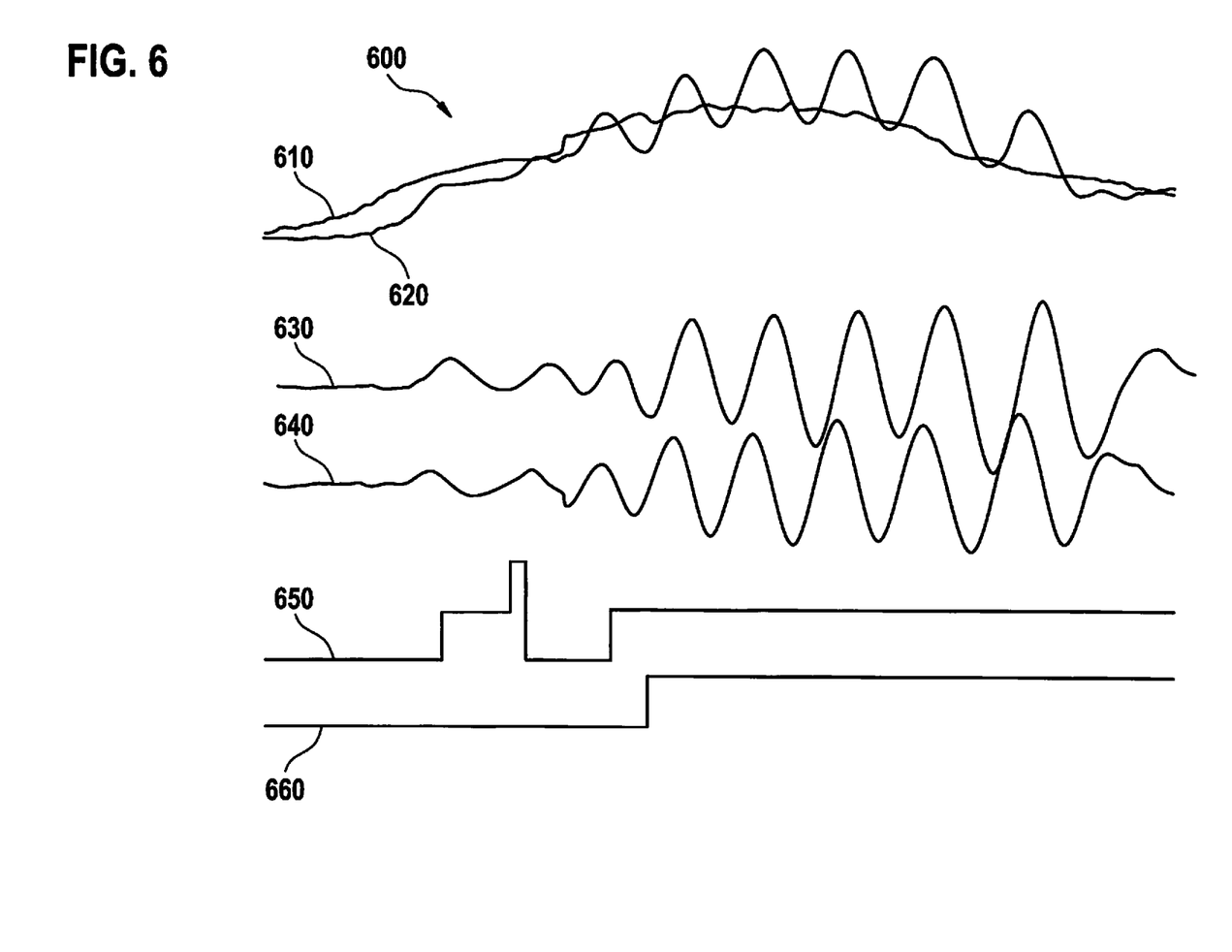
FIG. 6 a signal-characteristics diagram of signals according to an example embodiment of the present invention.

FIG. 6 shows a signal-characteristics diagram 600 of signals according to an exemplary embodiment. A first signal characteristic 610, a second signal characteristic 620, a third signal characteristic 630, a fourth signal characteristic 640, a fifth signal characteristic 650, and a sixth signal characteristic 660 are shown in signal-characteristics diagram 600. At least a partial quantity of signal characteristics 610-660 is to be evaluated in connection with the determination device and/or the vehicle from FIG. 2, in connection with the method from FIG. 3, and/or the determination process from FIGS. 4 and 5, or something along these lines.

The first signal characteristic 610 represents an ideal transverse acceleration or the setpoint yaw rate from FIG. 2. Second signal characteristic 620 represents a transverse acceleration or an actual transverse acceleration or the instantaneous yaw rate from FIG. 2. Second signal characteristic 620 has greater amplitudes or oscillations than first signal characteristic 610. Third signal characteristic 630 represents an amplitude of the lateral run-out or an amplitude of a yawing motion. Fourth signal characteristic 640 represents a rate of a lateral run-out amplitude or yawing-motion amplitude. Third signal characteristic 630 and fourth signal characteristic 640 are determined with the aid of first signal characteristic 610 and second signal characteristic 620. First signal characteristic 610, second signal characteristic 620, third signal characteristic 630, and fourth signal characteristic 640 represent analog signals, and fifth signal characteristic 650 and sixth signal characteristic 660 represent digital signals. In this context, fifth signal characteristic 650 and sixth signal characteristic 660 represent lateral run-out signals or yawing-motion signals. Fifth signal characteristic 650 and sixth signal characteristic 660 are determined using first signal characteristic 610 and second signal characteristic 620 and/or using third signal characteristic 630 and fourth signal characteristic 640.

Exemplary embodiments are described in different words and in the form of a summary with reference to FIGS. 1-6.

Determination device 230 or method 300 for determining takes input signals from environment sensor 210, which is developed as a video camera or some other sensor designed to detect a roadway curvature, e.g., a GPS sensor, a radar sensor, etc., and measuring signal 225 of the actually detected yaw rate of vehicle 100 in order to detect rolling or a lateral run-out in a more accurate manner. An expansion can also be provided in order to detect a deviation of a path of vehicle 100 with regard to an ego traffic lane. The use of a lateral acceleration also makes determination device 230 or method 300 for determining even more sensitive with regard to a speed since rolling or a lateral run-out are undesired at higher speeds.

In method 300 for determining and/or in the determination process, a comparison between an actual movement of vehicle 100 and an ideal or anticipated trajectory is carried out in order to determine rolling or lateral run-out. A vehicle 100 that exhibits rolling or lateral run-out has a tendency to swing about its vertical axis, which creates a yawing motion. The ideal yaw rate or setpoint yaw rate is calculated on the basis of a curvature of roadway 102. The curvature of roadway 102, for example, is determined based on a detection of lane markings with the aid of a video camera 210 or other environment sensors 210. The setpoint yaw rate represents the yaw rate of vehicle 100 in the absence of rolling or lateral run-out and under normal driving conditions. A deviation of the measured or actual yaw rate or instantaneous yaw rate from the setpoint yaw rate is measured and analyzed.

Safety-critical yawing motions or rolling or lateral run-out cause a deviation of the instantaneous yaw rate of vehicle 100 that oscillates about the setpoint yaw rate. A difference between the two signals 231 and 225 or 610 and 620 supplies comparison signal 233, which stays close to zero in most cases when vehicle 100 follows the curvature of roadway 102, and which swings or oscillates only when rolling or a lateral run-out is encountered. For example, a derivation check is carried out in order to determine maxima and minima of the amplitude or oscillation, which will then be analyzed based on the frequency and amplitude of the oscillation. Two successive turning points in the first derivation check correspond to an oscillation. A repeated occurrence of such oscillations is analyzed in order to determine whether vehicle 100 exhibits rolling or lateral run-out or safety-critical yawing motions.

Rolling and lateral run-out tend to become more unpleasant for a driver of vehicle 100, especially at greater speeds. For that reason, the use of a transverse acceleration or a comparison of a measured and an ideal transverse acceleration can make method 300 for determining and/or the determination process more sensitive with regard to unpleasant lateral run-out motions at higher speeds.

If an exemplary embodiments includes an "and/or" linkage between a first feature and a second feature, then this should be read in such a way that the exemplary embodiment according to a specific embodiment includes both the first feature and the second feature, and according to a further specific embodiment, includes either only the first feature or only the second feature.

What is claimed is:

1. A method comprising:
reading in trajectory data from an interface to at least one environment sensor of the vehicle, the trajectory data representing an anticipated trajectory of the vehicle;
ascertaining a setpoint yaw rate of the vehicle for the anticipated trajectory using the read-in trajectory data, and generating a specification signal which represents the setpoint yaw rate for the anticipated trajectory;
comparing the generated specification signal to a measured signal, the measured signal representing an instantaneous yaw rate of the vehicle occurring based on an actual trajectory of the vehicle, and generating a comparison signal based on the comparison;
comparing an amplitude of the comparison signal to a first threshold value, and comparing a frequency of the comparison signal to a second threshold value; and
responsive to a result of the comparisons being that both the amplitude of the comparison signal exceeds the first threshold value and the frequency of the comparison signal exceeds the second threshold value, outputting a yawing-motion signal, representing presence of a safety-critical yawing motion of the vehicle, for stabilizing the vehicle.

2. The method of claim 1, wherein the comparing of the amplitude of the comparison of the signal to the first threshold includes determining that the amplitude of the comparison signal exceeds the first threshold, and wherein the determination that the amplitude of the comparison signal exceeds the first threshold includes checking extreme points of a signal characteristic of the comparison signal using a derivation of the signal characteristic of the comparison signal.

3. The method of claim 1, wherein the comparing of the frequency of the comparison of the signal to the second threshold includes determining that the frequency of the comparison signal exceeds the first threshold, and wherein the determination of whether the frequency exceeds the second threshold value includes determining a number of turning points of a signal characteristic of the comparison signal that occur within a predefined time interval using a derivation of the signal characteristic of the comparison signal, and determining that the number exceeds the second threshold value.

4. The method of claim 1, wherein the comparison signal represents a difference between the specification signal and the measuring signal.

5. The method of claim 1, wherein the trajectory data include any one or more of image data, video data, and radar data detected using an environment sensor of the vehicle and that represent any one or more of a course, curvature, and lane marking of a roadway of the vehicle.

6. A device comprising a processor, wherein the processor is programmed to perform a method, the method comprising:
reading in trajectory data from an interface to at least one environment sensor of the vehicle, the trajectory data representing an anticipated trajectory of the vehicle;
ascertaining a setpoint yaw rate of the vehicle for the anticipated trajectory using the read-in trajectory data, and generating a specification signal which represents the setpoint yaw rate for the anticipated trajectory;
comparing the generated specification signal to a measured signal, the measured signal representing an instantaneous yaw rate of the vehicle occurring based on an actual trajectory of the vehicle, and generating a comparison signal based on the comparison;
comparing an amplitude of the comparison signal to a first threshold value, and comparing a frequency of the comparison signal to a second threshold value; and
responsive to a result of the comparisons being that both the amplitude of the comparison signal exceeds the first threshold value and the frequency of the comparison signal exceeds the second threshold value, outputting a yawing-motion signal, representing presence of a safety-critical yawing motion of the vehicle, for stabilizing the vehicle.

7. A non-transitory computer-readable medium on which are stored instructions that are executable by a processor and that, when executed by the processor, cause the processor to perform a method, the method comprising:
reading in trajectory data from an interface to at least one environment sensor of the vehicle, the trajectory data representing an anticipated trajectory of the vehicle;
ascertaining a setpoint yaw rate of the vehicle for the anticipated trajectory using the read-in trajectory data, and generating a specification signal which represents the setpoint yaw rate for the anticipated trajectory;
comparing the generated specification signal to a measured signal, the measured signal representing an instantaneous yaw rate of the vehicle occurring based on an actual trajectory of the vehicle, and generating a comparison signal based on the comparison;
comparing an amplitude of the comparison signal to a first threshold value, and comparing a frequency of the comparison signal to a second threshold value; and
responsive to a result of the comparisons being that both the amplitude of the comparison signal exceeds the first threshold value and the frequency of the comparison signal exceeds the second threshold value, outputting a yawing-motion signal, representing presence of a safety-critical yawing motion of the vehicle, for stabilizing the vehicle.

* * * * *